United States Patent [19]

Materna et al.

[11] Patent Number: 4,714,995

[45] Date of Patent: Dec. 22, 1987

[54] COMPUTER INTEGRATION SYSTEM

[75] Inventors: Anthony T. Materna; Roger A. Vossler, both of Santa Monica; Frank M. Stepczyk, Manhattan Beach, all of Calif.

[73] Assignee: TRW Inc., Redondo Beach, Calif.

[21] Appl. No.: 775,927

[22] Filed: Sep. 13, 1985

[51] Int. Cl.⁴ .............................................. G06F 15/16
[52] U.S. Cl. ................................................... 364/200
[58] Field of Search ......................... 364/200 MS File

[56] References Cited

U.S. PATENT DOCUMENTS 4,604,686 8/1986 Reiter et al. ......................... 364/200

Primary Examiner—Raulfe B. Zache

Attorney, Agent, or Firm—Noel F. Heal; Sol L. Goldstein

[57] ABSTRACT

Apparatus for integrating independent computer systems with associated heterogeneous data bases having some common or shared data entities. The apparatus includes an update capturing module installed at each of the computer systems, for capturing update transactions involving shared data entities, and a central data translator, which receives the updates from the update capturing modules, translates the updates into appropriate record formats and data base schemas, and transmits the translated replicas to the appropriate separate computer systems, where the updates are directly or indirectly entered into the corresponding data bases, thereby ensuring consistency among the separate but related data bases.

11 Claims, 7 Drawing Figures

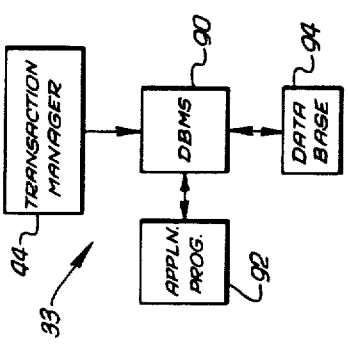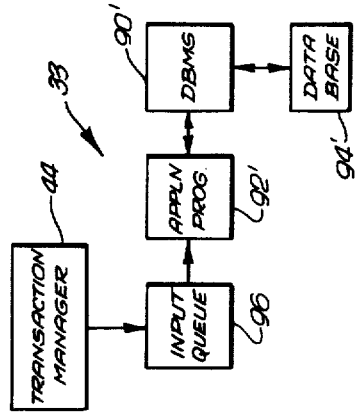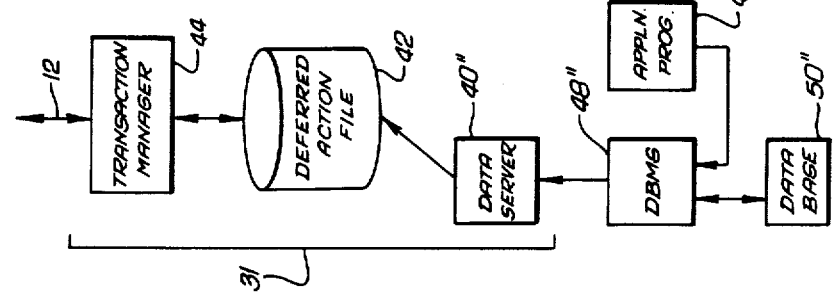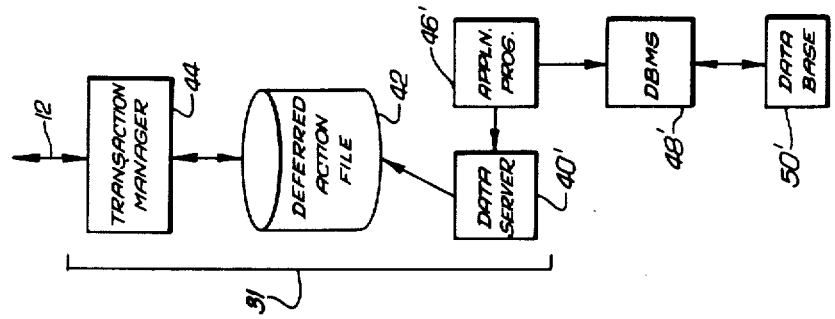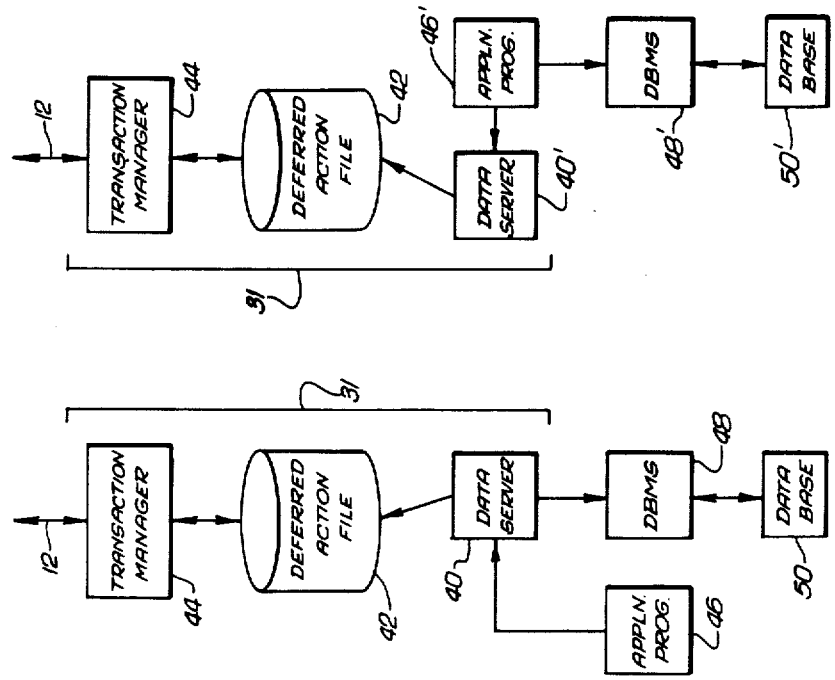

COMPUTER INTEGRATION SYSTEM

BACKGROUND OF THE INVENTION

This invention relates generally to techniques for integrating a number of independent, and typically, independently developed, computer systems that have a need to share certain common elements of data. More particularly, the invention relates to the integration of multiple computer systems that have heterogeneous data bases; that is to say, each computer system has a data base that is, in general, different from the others in form and structure, although not necessarily different in content. Integrating the computer systems means enabling the systems to communicate so that when one system creates or updates a data value, this change is transmitted to the other computer systems that use that data.

The problem of integration of multiple computer systems can arise in a variety of contexts. One typical example is in the area of manufacturing. Computer systems have been developed for computer-aided design (CAD), to aid in the development of manufacturing drawings directly from a designer's instructions; for computer-aided manufacturing (CAM), to control machine tools and robotics equipment; and for computer-aided engineering (CAE), to aid in the engineering of a product even before it reaches the design stage. In recent years, systems have also been developed for manufacturing resource planning (MRP), to control the flow of material and work products through a manufacturing process. In the same manufacturing plant, there may also be independent accounting and administrative computer systems with a need to share data in the other computers.

Typically, each such system is developed independently, using independent hardware and software, often obtained from different vendors for each system. Although it is readily apparent that a single integrated system to handle all of these functions would result in further improvement of the manufacturing process, most owners, managers and operators of manufacturing plants are understandably reluctant to discard the separate systems that have been developed for such functions as CAD, CAM, CAE and MRP.

Although there is general recognition that integration is needed, there is also a trend in computer architecture toward distributed systems, in which hardware processors and associated data bases are situated at different physical locations, but still operate to some degree as a single system. This trend suggests that factories might be run as integrated operations without integrating all computer-aided functions into a single, specially programmed machine with a single, specially developed data base. The basic problem in factory automation, and in a number of other applications, is one of data sharing. The data bases associated with the independent computer-aided functions have certain elements of data in common, but have no convenient technique for sharing the common data.

If all of the data bases were forced to employ a single organizational schema and a common record format for common data, this would certainly facilitate communications between data bases. Most proposed solutions to the integration problem have taken this approach. For example, in the paper entitled "IMPACT: A distributed database application," by Alan Norman et al., Proc. 1983 Natl. Computer Conf. pp. 203-17, the authors discuss a distributed data base system in which duplicate copies of a data base are maintained in different locations. Updates made to a data base in one location are transmitted to the other locations. However, identical data base schemas are employed at the multiple locations. In other words, the system is a "homogeneous" one, and there is little difficulty in distributing updates to the multiple data bases to achieve a desired degree of integration.

It has been recognized by some designers of integrated systems that there are advantages in employing distributed data systems having multiple copies of data bases. For example, the text entitled "Design and Strategy for Distributed Data Processing," by James Martin, published by Prentice-Hall, Inc., Englewood Cliffs, N.J. 07632, contains, in Chapter 19, a general discussion of distributed data systems, and describes various configurations of replicated data bases.

An early attempt at multiple computer integration is described in an article entitled "A System for Plant Operations," by James T. Fritsch, Bell Laboratories Record, June 1976, pp. 163-69. In this system, a specially designed central computer is used to control operations of a number of peripheral computer systems. For example, when a new order is received by an order processing computer, the central computer is informed, and coordinates subsequent operations by communicating with the other computers at various stages in processing the order. The central computer updates an order record in the order processing computer as the processing proceeds. The paper describes a multiple-computer system in which there is a need to communicate between the multiple computers. However, the subject of heterogeneous data bases is not raised, and the data bases are apparently designed to be completely compatible with each other.

A query-only data base is discussed in a paper entitled "An Overview of Multibase," by Terry Landers et al., published in Distributed Data Bases, H. J. Schneider, editor, by North Holland Publishing Company, 1982, pp. 153-84. Multibase permits a user to access different data bases by employing a single data base schema and a single query language. Multibase performs all the necessary translations for the user and provides a logically integrated query-only user interface to the physically non-integrated environment of the multiple data bases. Multibase is not concerned with maintaining consistency among the data bases, but merely with providing a user interface for querying the data bases.

Although the integration problem and its solution are described in this specification largely in terms of a computer integrated manufacturing system, it will be understood that similar considerations also apply to other applications involving distributed data bases, such as airline reservation systems, banking systems, and so forth.

There is also a related, and more general problem of integrating large numbers of microcomputers to provide inquiry access to a number of heterogeneous data bases. In many situations, it is desirable to provide microcomputers access to different data bases for read-only or inquiry purposes. Until now, the heterogeneous nature of the data bases has made it very difficult to integrate microcomputers with larger mainframe computers except in relatively simple configurations. Accordingly, it would also be desirable to provide a solution to this related problem.

It will be appreciated from the foregoing that there is still a need for a technique for integrating multiple computer systems having heterogeneous data bases. Ideally, the heterogeneous data bases should be promptly updated to maintain consistency of the common or shared data, and should be updated in a manner that does not jeopardize the integrity of any of the data bases. In addition, the solution to the problem should ideally be adaptable to integrate microcomputers with read-only capability into a larger system of heterogeneous data bases. The present invention is directed to these ends.

SUMMARY OF THE INVENTION

The present invention is a system for integrating a number of different host computers with heterogeneous data bases, by controlled replication of common data, to ensure that identical data items in the data bases are maintained consistent with each other. (For the purpose of this description, when the same data items appear in two or more data bases, those items are referred to as "duplicate data" or "common data.") Although the principles of the invention are applicable to most distributed data systems, the invention is best suited to applications, such as factory automation systems, in which the data bases do not have to be updated on a real-time basis. In such applications, when a common data item is modified in one data base, the modification does not usually have to be immediately replicated in other data bases, but may be replicated seconds, minutes, or even hours later without harmful effect.

Briefly, and in general terms, the apparatus of the invention includes a data translator for translating data items received from any one of the host computers' local data bases for storage in any other of the data bases, a communications network connecting the host computer systems or data bases to the data translator, and update management means, associated with each host computer system, for transmitting to the data translator over the communications network the values of any changes made by the update manager's associated host computer to shared data in that computer's data base, and for receiving translated data base changes from the data translator. The data translator translates data base changes from the data base organization and record format in which they are received from one data base into the respective data base organizations and record formats of some of the other host computers' local data bases. The data translator then transmits the translated changes to those data bases, thereby ensuring consistency of the separate data bases without imposing on any of them a particular data base organization o record format.

In the illustrative embodiment of the invention, the data translator includes a dictionary module, for storing the data base organizations and record formats for each of the data bases having shared data, and a distribution module, for receiving data base update transactions from the computer systems, performing necessary translation of the updates, and initiating transmission of replicas of the updates to the other data bases that share access to the updated data. The data translator also includes an authorization module, for verification of ownership of each updated item of data, to ensure that only a single owner of the item can initiate updating.

The data translator further includes a communications module, for sending and receiving data over the communications network. The data translator may also include a recovery module, the purpose of which is to save and restore critical data in the event of a system error or malfunction.

The data update managers associated with each of the computer systems take a number of different forms, depending in part on the nature of the application program running in the computer system. In one arrangement, a data server is interposed between the application program and its associated data base management system, to intercept all data base accesses made by the application program. The data server detects updates made to shared data, and saves these in a deferred action file, for later transmission over the communications network to the data translator. In another approach the data server receives control from the application program either before or after each data base access. Again, updates to shared data are detected and placed in the deferred action file. In a third variant of the same general approach, the data server is coupled to the data base management system and effectively detects those updates relating to shared data. In all three cases, there is a relatively simple interface with the application program or the associated data base management system, and the application program requires little or no modification. In some existing applications, data base accesses are already routinely recorded in an audit file, so that the data server merely has to select those transactions relating to updates of shared data and transfer them to the deferred action file.

An optional additional feature of the invention is a query processor, which comprises a central computer and data base. The query processor data base stores a selected subset of the data in all the hosts' local data bases. The query processor receives queries (i.e., requests for data) from any of the hosts over the communications network, retrieves the requested data from the query data base, and transmits it to the requesting host. Queries may also be requested over the communications network by display terminals or microcomputers which do not maintain their own data bases and hence are not part of the set of integrated computer systems discussed in the preceding paragraphs.

To maintain the query processor data base consistent with the corresponding data in the various local data bases, the data translator sends data updates to the query processor just as it would send updates of duplicate data to any of the local data bases of the host computers.

It will be appreciated from the foregoing that the present invention represents a significant advance in the field of distributed computer systems. In particular, the invention provides a technique for conveniently sharing data among multiple heterogeneous data bases, by translating and distributing updates of the shared data. Other aspects and advantages of the invention will become apparent from the following more detailed description, taken in conjunction with the accompanying drawings.

BRIEF DESCRIPTION OF THE DRAWINGS

FIGS. 2a, 2b and 2c are block diagrams illustrating three types of interface between application programs in the host computer systems and a transaction management module used to provide communications with the host system data bases;

FIGS. 4A and 4B are block diagrams showing two alternative embodiments of the portion of the update manager that receives updates from the data translator.

DESCRIPTION OF THE PREFERRED EMBODIMENT

The present invention is a system for integrating a number of host computers having heterogeneous data bases so that any identical data items in the data bases are maintained consistent with each other.

In this description, the smallest independently accessible item of data in a data base is referred to interchangeably as a "data item", "data entity", "data element", "data field", or "data attribute". The local data bases of the various host computers are referred to as heterogeneous because they have different organizational schema or structures and different record formats for storing data.

The different data bases are partially duplicative or redundant in that the same data item may be included in two or more data bases. For example, a data item which specifies a physical attribute of a part may be contained in a CAD data base, a CAM data base and an MRP data base. Such data items included in two or more data bases are referred to as "duplicate data" or "common data".

Integration of these different data bases, which is the principle object of this invention, means ensuring that data items which are common to two or more data bases are consistent with each other, i.e., ensuring that common data items have identical data values. Integration requires that when a host computer updates the value of a data item in, or adds a new data item to, its local data base, this change must be replicated in all the other host computers' local data bases which contain the same data item. For example, if a CAD system changed a dimension of a part, the same change should be made (i.e., replicated) in the stored value of that part's dimensions in the CAM and MRP data bases.

As will be discussed more fully below, in the preferred embodiment the integration problem is simplified by assigning each common data item an "owner" which is the only local data base permitted to update that data item. The other local data bases which contain the same data item will receive updated data values whenever the "owner" updates that data item, but those other data bases are not permitted to initiate an update. This concept of each data item having a single "owner" is logical in most applications. Returning to the preceding example, it does not make sense for a CAM or MRP system to initiate a change in the dimensions of a part, so it is logical that the CAD system be the exclusive "owner" of a part's dimensional data.

An alternative approach is to permit ownership of a data item to be passed from one local data base to another, but not permit a data item to be owned by more than one data base at a time.

Figure 1:
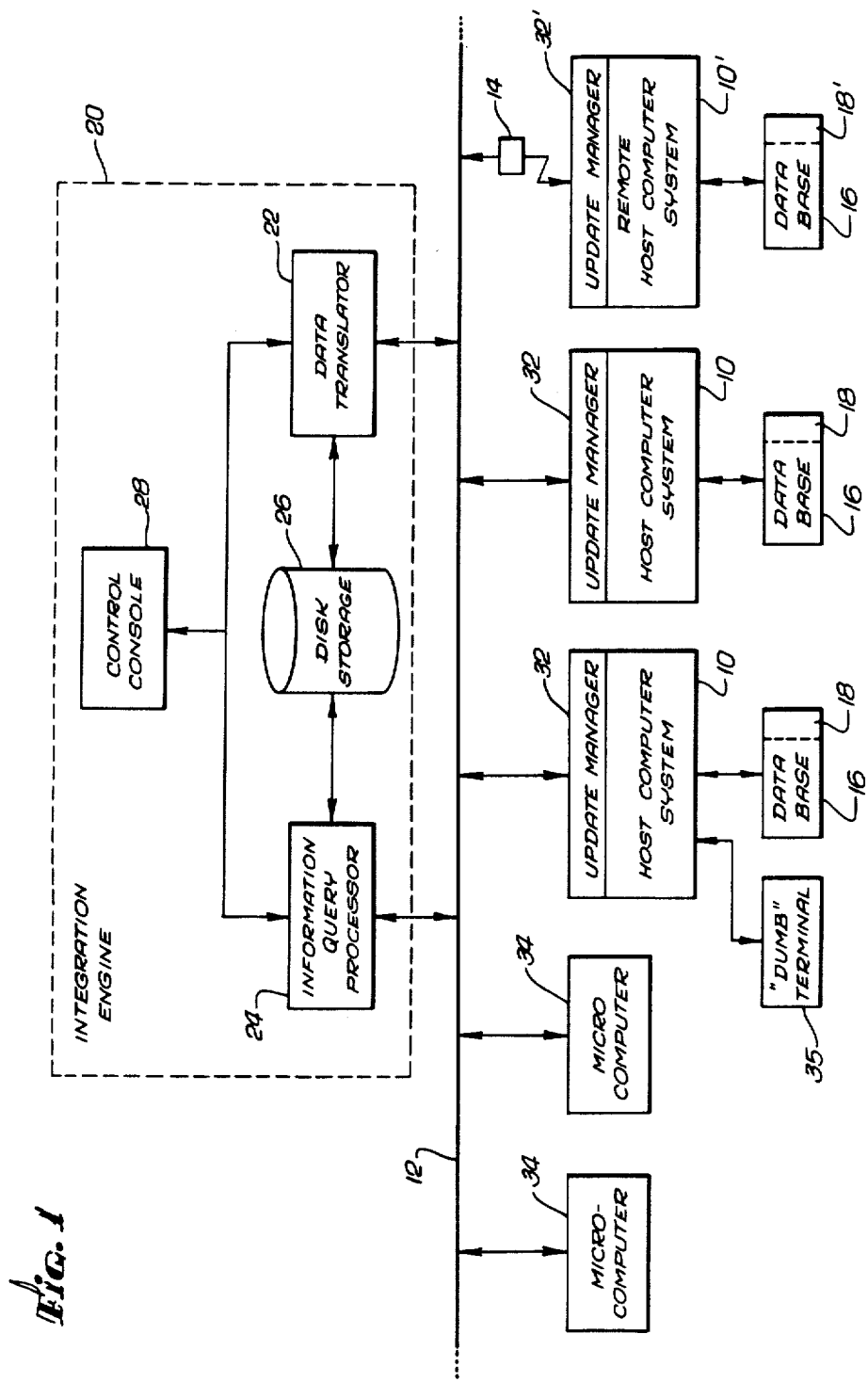
FIG. 1 is a block diagram illustrating a preferred embodiment of the invention connected to a plurality of local and remote host computer systems.

In accordance with the invention, the updates to shared data are transmitted to a central location and then replicated in a translated form for distribution to other data bases. This is shown in general form in FIG. 1, in which two host systems 10 are connected to a common local area network 12, and a third remotely-located host 10' is connected to the same network through a communication link 14. In practice, the number of interconnected hosts is likely to be greater than the three shown in FIG. 1. The host systems 10 and 10' are independent computer systems having independent local data bases, indicated at 16 and 16'. Although each of these local data bases is independently accessed and controlled by its respective host system, each local data base has some data elements, indicated diagrammatically at 18 and 18', that are common to (i.e., duplicated in) one or more (but not necessarily all) of the other local data bases. Such data is referred to as "common data" 18. In general, a local data base will have certain data items in common with one of the other data bases and different data items in common with another of the data bases.

In the apparatus of the invention, a computer (and software) system, referred to as the integration engine 20, is coupled via a communications network 12 (preferably a local area network) to the host computers 10 and 10'. The integration engine 20 has four principal components: a data translator 22, an information query processor 24, a disk storage module 26, and a control console 28. The disk storage module 26 may be accessed by both the data translator 22 and the query processor 24. Also, the data translator 22, query processor 24 and control console 28 are either loosely or tightly coupled together by means of either another communication network or a bus, indicated at 30.

The principal function of the integration engine 20 is performed by update translator 22, which receives updates of common data from the local data bases, translates the data into the appropriate format for the other data bases which contain the same data items, and then sends the translated data to the other data bases.

Each of the host computer systems 10, 10' includes an update manager 32, 32', which comprises an update capture module 31 and an update receiver module 33. The update capture module 31 functions to intercept or "capture" every update made to an item of common data at a host computer system 10, and to transmit this to the data translator 22 when requested to do so by the data translator. The update receiver module 33 receives update transactions from the data translator 22 and effects updating of the host computer's data base.

In brief, the sequence of operations is that, when an owner of a data attribute updates or changes the attribute, the update capture module 31 captures this information and records it for later transmission to the data translator 22. The data translator 22, which controls the distribution of all data updates, subsequently polls the update capture module 31 and receives the data update. The data translator 22 translates the update from the data base schema and format in which it was received from the "owner" of the data into one or more different schemas and formats in which it is stored by one or more of the other host computers, and then it transmits the translated replicas of the data update to those other host computers. At the host computer receiving such a translated update, its update receiver module 33 accesses its local data base, either directly or indirectly, and updates the appropriate data attribute to be consistent with the data attribute in the owner's data base.

The information query processor fulfills a different function. It maintains a query data base in disk storage 26 comprising a predetermined subset of the common data. The data items in the query data base are updated by the data translator 22 in the same manner as if the query data base were another host computer data base. The query data base is used only to satisfy queries (read-only) for data made by various micro-computers 34 connected to the local area network 12. Alternatively, queries may be made from a terminal 35 connected to one of the host computers 10. In some applications, larger numbers of microcomputers may be connected to the network 12, either separately or through cluster controllers (not shown), and each connected microcomputer can be provided with read-only access to a multiplicity of data bases, portions of which are replicated in the query data base.

In addition to its basic query function the information query processor 24 optionally can be designed to function as backup for data translator 22. It is preferably identical to the data translator 22 in hardware structure. In the event of a serious malfunction of the data translator 22, the query processor 24 preferably can assume the role of the data translator until both systems have been made fully operational again.

FIG. 2 shows three alternative designs for update capture module 31 having three principal components: a data server 40, a deferred action file 42 and a transaction manager 44. FIG. 2a shows a first configuration by means of which the data server 40 is connected to an application program 46 having an associated data base management system (DBMS) 48 and data base 50. In its unmodified or original state, the application program 46 accessed its data base by means of commands made to the DBMS 48, which, in turn made access to the data base 50. In this configuration, the data server 40 is interposed between the application program 46 and the DMBS 48, but is "transparent" as viewed from the program 46. In other words, the application program 46 is unaltered, and continues to make requests to its DBMS 48. The requests are, in effect, filtered by the data server 40, which has built into it the identities of the shared data attributes. Accordingly, the data server 40 can identify which of the update requests made by the application program 46 are made with respect to common data attributes. These identified items are "captured" by the data server 40 and transferred to the deferred action file 42, which is basically an output queue for captured data updates of common data.

In an alternative configuration, shown in FIG. 2b, the application program, referred to by 46', is tied more intimately with its DBMS 48', and may even be part of one software package. Accordingly, interposing the data server between the application program and its DBMS is less practical. However, the application program 46' may be easy to modify to interface directly with the data server 40', as shown in the figure, allowing the data server to obtain control before or after each request to the DBMS 48'. As in the first-described configuration, the data server 40' identifies data updates being applied to common data, and saves the details of these requests in the deferred action file 42.

The third configuration, shown in FIG. 2c, also includes a data server 40", an application program 46", a DBMS 48" and a data base 50". In some cases, an application program routinely saves an audit log of all requests to its DBMS. The data server 40" need then only monitor the audit log and identify those transactions relating to the updating of shared data items. These are saved in the deferred action file, as previously described.

If the application program 46" does not produce an audit log, there is another method by which the data server 40" can detect when common data is updated. In this method, data server 40" periodically accesses DBMS 48" to obtain the current values of all common data "owned" by that application program 46". Data server 40" then compares this set of data values with the set of values it collected the previous time. Any values which are different are values which have been updated by the application program 46". Data server 40" then sends these updated values to the update capture module 31 for transmission to the update translator 22.

Figure 3:
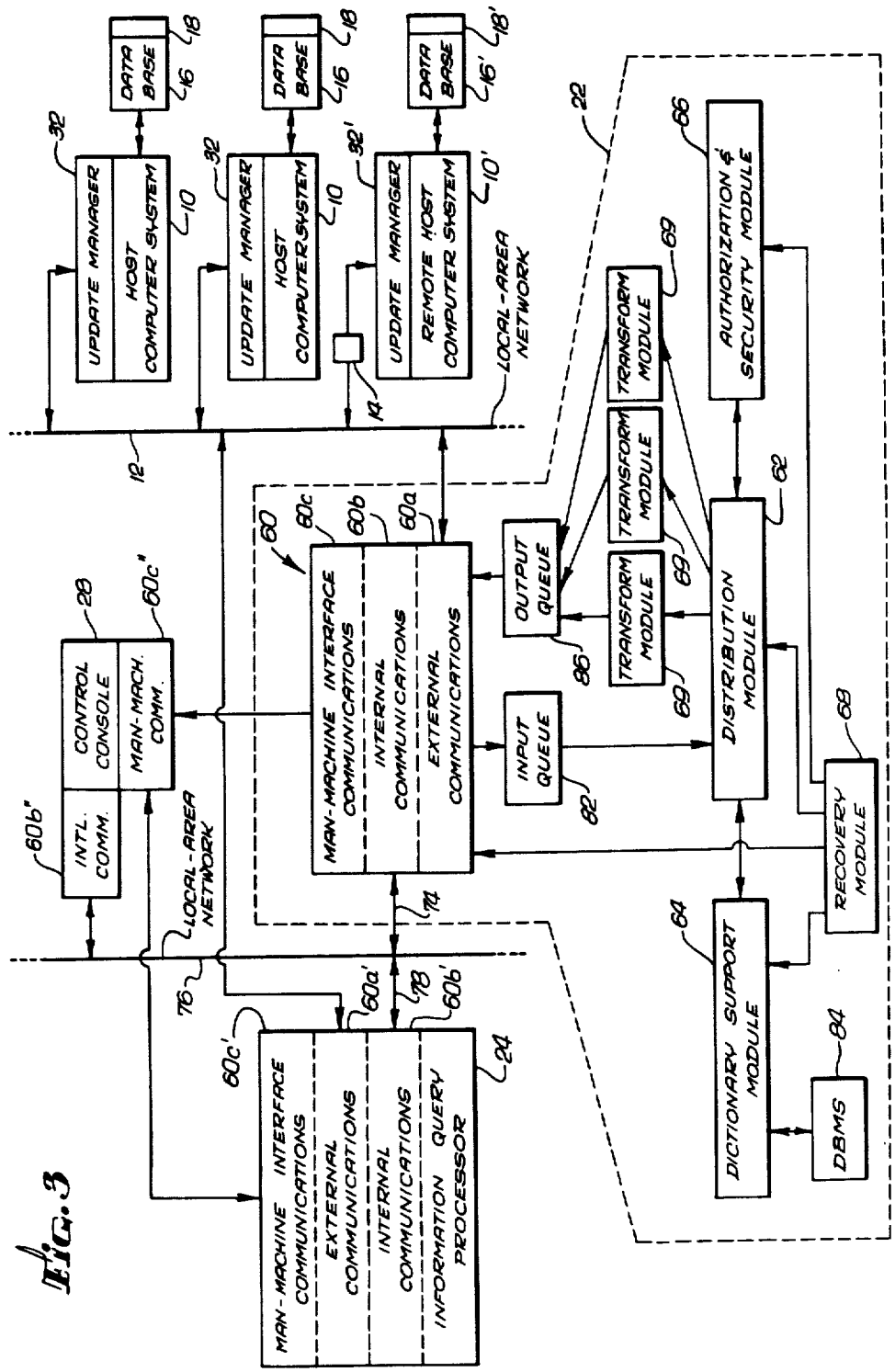
FIG. 3 is a more detailed block diagram of the invention, with primary emphasis on the data translator.

Once transactions have been queued in the deferred action file 42, they will subsequently be transmitted by the transaction manager 44, when periodically requested (polled) by the data translator 22. How these transmissions are accomplished will be best understood from a more specific discussion of the computer integration engine 20 (FIG. 1), which is shown in more detail in FIG. 3.

The data translator 22 includes six principal modules. These are a communications module 60, a distribution module 62, a dictionary module 64, one or more transform modules 69, an authorization and security module 66, and a recovery module 68. The communications module 60 includes an external communications module 60a for communicating with the host computer systems 10 through the local area network 12, an internal communications module 60b for communicating with the information query processor 24 and the control console 28, and a man-machine interface communications module 60c for communicating with the control console. The man-machine interface communications module 60c has counterparts 60c' and 60c" in the information query processor 24 and the control console 28, respectively. The modules 60c, 60c' and 60c" provide communication between the control console and the processors 22 and 24 over lines 70 and 72, respectively, to permit the control console to perform monitoring and control functions with respect to the two processors, and to provide an appropriate interface with a control console operator.

For convenience of monitoring and control, the control console 28 preferably employs a system of display "windows" to allow the display of information from multiple sources at the same time. The principal functions of the console 28 are the display of audit logs, the display of performance statistics of the data translator 22 and the query processor 24, a graphical display of the status of the network to which the integrating engine 20 and the host computer systems 10 and 10' are connected, and storage and retrieval of information in the central data base and in the dictionary support module 64.

At the "internal" communications level, which is separate from the man-machine interface communications level, the internal communications module 60b is connected by a line 74 to an internal communications network 76. Corresponding internal communications modules 60b' and 60b" in the information query processor 24 and the control console 28 are connected to the same network 76, by lines 78 and 80, respectively. This arrangement provides for necessary communications among the three processors 22, 24 and 28, other than that needed for the man- machine interface functions. The communications network 76 used for internal communications may use any conventional communications protocol. For example, the presently preferred protocol is TCP/IP (transport control protocol/internet protocol), which is becoming recognized as the standard for use with the well-known Unix operating system software for computers.

The external communications module 60a connects the data translator 22 to the local area network 12 to which the host computer systems 10 and 10' are also connected. The query processor 24 also has an external communications module 60a' to transmit requested data base information back to read-only computers or terminals connected to the network 12.

The purpose of the external communications module 60a is to handle the details of message transmission between the data translator 22 and the update managers 32 at each of the host computer systems. The actual communications protocol employed will depend on the protocols that can be handled by the host computer systems 10 and 10'. If the local computer systems are not compatible with a single communications protocol, the data translator can communicate with different subsets of the local systems over different communications networks.

In the preferred embodiment, external communications module 60a initiates communication with one of the local computers 10 via one of three basic communications commands: a SEND, a RECEIVE and an AUDIT command, each of which will now be explained in more detail.

When distribution module 62 is ready to transmit updates to one of the host computer systems 10, the distribution module requests the external communications module 60a to send the local computer a SEND command, together with the accompanying data and the intended destination of the data. (Depending on the actual communications protocol employed to communicate over the network 12, each SEND, RECEIVE or AUDIT command may have to be preceded by a CONNECT command to establish communication between the data translator 22 and the update manager 32 of a desired host computer system 10.) From the point of view of the distribution module 62, once a SEND command is issued, the external communications module will automatically transmit the message, and the distribution module may continue performing other functions.

To confirm that transaction updates are successful at each host destination, each host computer preferably will, after applying the transaction update transmit back a status acknowledgement message when later requested to do so. These status acknowledgment messages will not necessarily be transmitted separately, in a one-for-one relationship with the original SEND commands. Instead, status acknowledgments may accumulate at a host computer system and be transmitted as a batch upon request of the data translator 22.

The RECEIVE command is basically a polling command, instructing a selected host computer system to transmit either data transactions, status acknowledgment messages, or AUDIT responses (described in the next paragraph) that are ready to be transmitted. The data translator 22 may also request that a general status message be transmitted back from a host computer, to provide overall status information to the integration engine 20. The distribution module 62 can determine from the content of a received message whether it is a transaction, a status acknowledgment, an AUDIT response, or a general status response.

The AUDIT command is an additional check that allows the distribution module 62 to query a data base at a host computer, and determine whether a previously transmitted data update at the attribute level has been correctly made. Two alternative approaches may be employed. In one, only a data attribute identifier is transmitted with the AUDIT command. The host computer system retrieves the identified attribute, transmitting it back to the data translator 22. The distribution module 62 can then compare the retrieved data attribute with the update that was previously transmitted, and prepare an exception report if the attribute has not been correctly updated. The alternative approach is to transmit both a data attribute identifier and a copy of the updated data attribute as well. The host computer system then not only retrieves the data attribute, but compares it with updated data received with the AUDIT command, and sends back a message indicating whether or not the attribute has been correctly updated.

The return messages generated as a result of AUDIT commands are not transmitted until a RECEIVE command polls the host computer system. In this way, the data translator 22 retains control of all of the message traffic on the network 12 connecting the computers. Polling of the host computers may be performed on a selected priority basis, such that each host computer system is assigned a priority, or may be performed sequentially, depending on the requirements of the application programs at the host computers. Polling with RECEIVE commands may or may not have a priority over SEND and AUDIT commands, depending on the overall requirements of the system.

The key components of data translator 22 which actually perform the translations of updates from one data base schema to another are dictionary module 64 and one or more transform modules 69.

The dictionary module 64 contains information with respect to each common data base entity. This information includes, for each entity, an entity name, an alternative name (if necessary), node number identifiers of each local data base that contains the entity, an indication of the schema classification, an update template for each schema, the owner identification, and possible descriptive information concerning the entity. This dictionary information can be stored in any convenient format for access through a data base management system (DBMS) 84. The presently preferred approach uses an extended relational format for the dictionary.

Each transform module 69 uses the information from the dictionary module 64 to reformat or translate data updates from the schema in which it is stored in the host computer system 10 which "owns" that data item to the schema in which it is stored in one of the other host systems 10 which uses that data item. There is no need for a translation to a universal intermediate schema; instead, the data is translated directly from the owner's data base schema to the other host computer's data base schema.

Generally, data translator 22 may include a different transform module 69 for each pair of data base schemas between which translations must be made. Alternatively, a single transform module 69 may be designed to perform translations from any selected schema within a first group into any selected schema within a second group, wherein the schemas in the first group are similar to each other and the schemas in the second group are similar to each other.

In operation, the communications module 60 serially polls each of the host computer systems 10 via communications network 12 to request transmission of any updates to common data which that host may have made since the last time it was polled. If the host does have any such updates, the host's update manager 32 transmits the updates over communications network 12 to the data translator's communications module 60. The communications module stores the updates in input queue 82 until the distribution module 62 has a chance to process the updates.

The distribution module obtains from dictionary module 64 information specifying which host computers need to receive the updates and a "template" specifying how to reformat or translate the data into the schema of the host computer's data base to which it is to be sent. The distribution module then passes all this information to the appropriate transform module 69, which performs the actual data schema translation. The transform module 69 then stores the translated representation of the data update in output queue 86, to await transmission by external communications module 60a to the appropriate host computer 10.

Preferably, data translator 22 includes a multitasking computer system, and each of the transform modules 69 is an independent, asynchronous task. Execution of each task is controlled by a command file created by the distribution module 62. The transform module preferably deletes the command file when the task is completed. This multi-tasking computer organization is particularly suited to the use of multiple computer processors.

The authorization and security module 66 fulfills two broad functions. One is to verify that each update has originated from the correct owner of the entity or attribute being updated. The other is to provide any necessary validity checks dictated by particular applications. For example, it may be critical that certain data base attributes be updated in a particular sequence, or that two or more attributes be updated simultaneously. Such validity checks should ordinarily be handled at each of the host computer systems, but the authorization and security module 66 provides an additional, and sometimes necessary layer of security at a central location.

The recovery module 68 is to provide a back-up to the data translation facility, and to make the common data base consistent again after a host system resumes operation following a period of disconnection from the network. In the case of a serious malfunction of the data translator 22, the central console 28 will detect this event during its routine monitoring activity, and will initiate switching the data translation function to the query processor 24, which will temporarily cease its query processing functions. Transaction logs will be maintained to preserve the data base at the central facility. During a period of disconnection of a host computer system from the data translator 22, updates that would ordinarily be transmitted to the disconnected system are recorded in a log file. After the disconnected system comes back on line, the log file of update transactions is transmitted to the reconnected host system. For complete consistency, updates originating in the disconnected host system must also be recorded at the host during the period of disconnection, and transmitted subsequently when the system is reconnected to the data translator 22.

Distribution of update replicas to a host system may be made by one of two basic approaches: either direct or indirect. These are illustrated in FIGS. 4a and 4b. In the direct approach shown in FIG. 4a, an update transaction is transmitted directly to a data base management system (DBMS) 90 associated with an application program 92 running in the host computer. The host computer's transaction manager 44, upon receiving an update from the data translator 22, makes one or more appropriate requests to the DBMS 80, to directly record the updates in the local data base 94 of the host computer.

Indirect updating is used when direct access is precluded for some reason, such as synchronization considerations. For example, the application may need to update various other data entities upon receiving a particular update. Only the application program in the host computer has complete knowledge of these special circumstances, which is why the update transaction is transmitted to the application program, as shown in FIG. 4b. Basically, the transaction manager 44 places the received transaction in an input queue 96 for processing by the application program 92, and subsequent transmission to the DBMS 90', to update the data base 94'. In the case of indirect updating, the update transaction is formatted in the data translator 22 in the form of an input item for the application program.

It will be appreciated from the foregoing that the present invention represents a significant advance in the field of integration of independent computer systems having heterogeneous data bases. In particular, the invention achieves integration of distributed heterogeneous data bases by making translated replicas of data base updates, and distributing the replicas to other data bases in the formats and schemas used by the individual data bases. Preferably, the invention also provides a query capability by maintaining a data base of selected common data for read-only accesses.

It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. In a system for integrating a plurality of host computer systems having separate and local data bases having different organization and record formats with at least some items of data being included in more than one of the local data bases, said data items being designated "shared data items", and integrating system for ensuring that the values of the shared data items in the different local data bases are maintained consistent with each other, the integrating system comprising:

data translator means for translating data items received from any one of the local data bases for use in any other of the local data bases;

a communications network connecting the computer systems and the data translator means;

a plurality of update managers, each update manager being in communication with one of the host computer systems having a local data base, and each update manager including update capture means for transmitting to the data translator means over the communications network the values of any changes made by the update manager associated with the host computer to shared data in that computer's local data base, and update receiver means for receiving translated data base changes from the data translator over the communications network;

wherein the data translator means translates data base changes from the data base organizaiton and record format in which they are received into one or more other data base organizations and record formats, and transmits the translated changes over the communications network to each of the host computer local data bases, thereby ensuring consistency of the separate local data bases without imposing on any of them a particular data base organization or record format.

2. A system as defined in claim 1, in which: the data translator means includes a dictionary module for storing the record formats and data base organizations of the data bases associated with the separate computer systems.

3. An integrating system as defined in claim 1, and further comprising:
   query data base means connected to the data translator means for receiving from data translator an additional replica of common data base items and for storing said common data; and
   query processing means, coupled to the query data base, for receiving and responding to requests for information from the query data base.

4. An integrating system as defined in claim 1, in which the data translator means includes:
   a communications module for controlling transmission of data over the communications network;
   a dictionary module containing data base organizations and record formats of the separate data bases; and
   one or more transform modules for performing said translations of data base changes using the information in the dictionary module on the organization and record format of each of said host computers which is to receive the translated data base changes;

5. An integrating system as defined in claim 4, in which the data translator further includes:
   an authorization and security module to ensure the integrity of the data bases; and
   a recovery module to ensure consistency of the data bases following an inadvertent disruption of processing.

6. An integrating system as defined in claim 1, in which the update capture means includes:
   a data server to identify data base updates relating to items of common data; and
   storage means for temporarily storing updates provided by the data server.

7. An integrating system as defined in claim 6, in which:
   the data server is interposed between an application program and an associated data base management system, to identify commands issued to the data base management system that relate to common data updates.

8. An integrating system as defined in claim 6, in which:
   the data server is activated by an application program each time an update function is performed by the application program.

9. An integrating system as defined in claim 6, in which:
   the data server derives update information from a data base management system associated with an application program that performs updates from time to time through the data base management system.

10. An integrating system as defined in claim 1, in which:
    the update manager transmits updates received from the data translator means directly to a data base management system.

11. An integrating system as defined in claim 1, in which:
    the update manger transmits updates received from the data translator means into an input queue for an applicaiton, which is then responsible for transmitting the updates to an associated data base management system.

* * * * *